(12) United States Patent
Wong et al.

(10) Patent No.: US 7,970,443 B2
(45) Date of Patent: Jun. 28, 2011

(54) EXPENDABLE SCREEN AND MOBILE PHONE USING THE SAME AND DISPLAY CONTROLLING METHOD THEREFOR

(75) Inventors: Shih-Fang Wong, Taipei Hsien (TW); Chung-Yuan Chen, Taipei Hsien (TW); Qun Huang, Shenzhen (CN); Pin-Feng Fu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 845 days.

(21) Appl. No.: 11/941,085

(22) Filed: Nov. 16, 2007

(65) Prior Publication Data
US 2008/0318633 A1 Dec. 25, 2008

(30) Foreign Application Priority Data
Jun. 22, 2007 (CN) .......................... 2007 1 0200863

(51) Int. Cl.
*H04M 1/00* (2006.01)

(52) U.S. Cl. ............... 455/575.1; 455/575.3; 455/575.4; 455/572; 455/573; 455/574

(58) Field of Classification Search .................. 455/566, 455/572–574, 571.1, 571.3; 345/1.1–2.3
See application file for complete search history.

(56) References Cited

U.S. PATENT DOCUMENTS

| | | | |
|---|---|---|---|
| 6,302,612 B1 | 10/2001 | Fowler et al. | |
| 7,180,665 B2 | 2/2007 | Daniel et al. | |
| 2004/0214612 A1* | 10/2004 | Park et al. | 455/566 |
| 2005/0136999 A1* | 6/2005 | Jeon | 455/575.3 |
| 2007/0282687 A1* | 12/2007 | Laves | 705/14 |

* cited by examiner

*Primary Examiner* — Kamran Afshar
*Assistant Examiner* — Neda Behrcoz
(74) *Attorney, Agent, or Firm* — Frank R. Niranjan

(57) ABSTRACT

An expandable screen is for displaying display information according to a display mode command. The expandable screen includes a main screen, an extension screen, and a display controller. The extension screen pivotally connected to the main screen via a hinge. The display controller is for receiving the displaying information and the display mode command, and for controlling the main screen and the extension screen according to the display mode command. A mobile phone using the expandable screen, and a display controlling method are also disclosed.

14 Claims, 7 Drawing Sheets

EXPENDABLE SCREEN AND MOBILE PHONE USING THE SAME AND DISPLAY CONTROLLING METHOD THEREFOR

BACKGROUND

1. Field of the Invention

The present invention generally relates to an expandable screen and a mobile phone using the same, and particular to a display controlling method for the mobile phone.

2. Description of Related Art

As wireless communication tools, mobile phones are widely used. Originally, mobile phones were only designed for voice communication. However, with advances in technology, many additional services, such as short message service (SMS) for text messaging, emailing, packet switching for access to the Internet, and multimedia messaging service (MMS) for sending and receiving photos and video, have been supported by current mobile phones.

In order to facilitate reading information from the current mobile phones the size of the screens of the current mobile phones need to be larger. However, if the screens are larger, the mobile phones may have to increase in size in order to accommodate the larger screen. Since mobile phones are portable electronic devices and commonly carried in pockets, thus, users like smaller mobile phones.

Therefore, an expandable screen for a mobile phone and a display controlling method are needed in the industry to address the aforementioned deficiencies and inadequacies.

SUMMARY

An expandable screen is for displaying display information according to a display mode command. The expandable screen includes a main screen, an extension screen, and a display controller. The extension screen pivotally connected to the main screen via a hinge. The display controller is for receiving the displaying information and the display mode command, and controlling the main screen and the extension screen according to the display mode command. A mobile phone using the expandable screen, and a display controlling method are also disclosed.

Other advantages and novel features of the present invention will become more apparent from the following detailed description of preferred embodiment when taken in conjunction with the accompanying drawings, in which:

DETAILED DESCRIPTION OF THE EMBODIMENT

Reference will now be made to the drawings to describe a preferred embodiment of the present expandable screen, the present mobile phone and a preferred embodiment of the present display controlling method.

Figure 1:
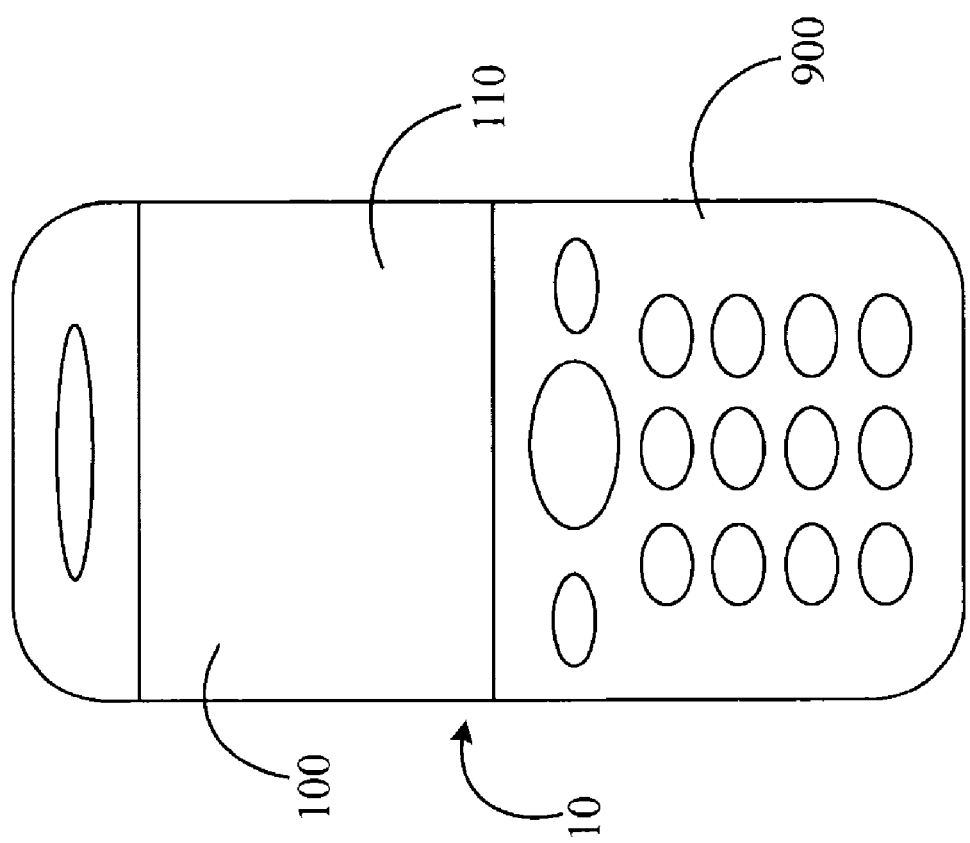
FIG. 1 is a schematic diagram showing a mobile phone in accordance with an exemplary embodiment in a folded state.
Figure 2:
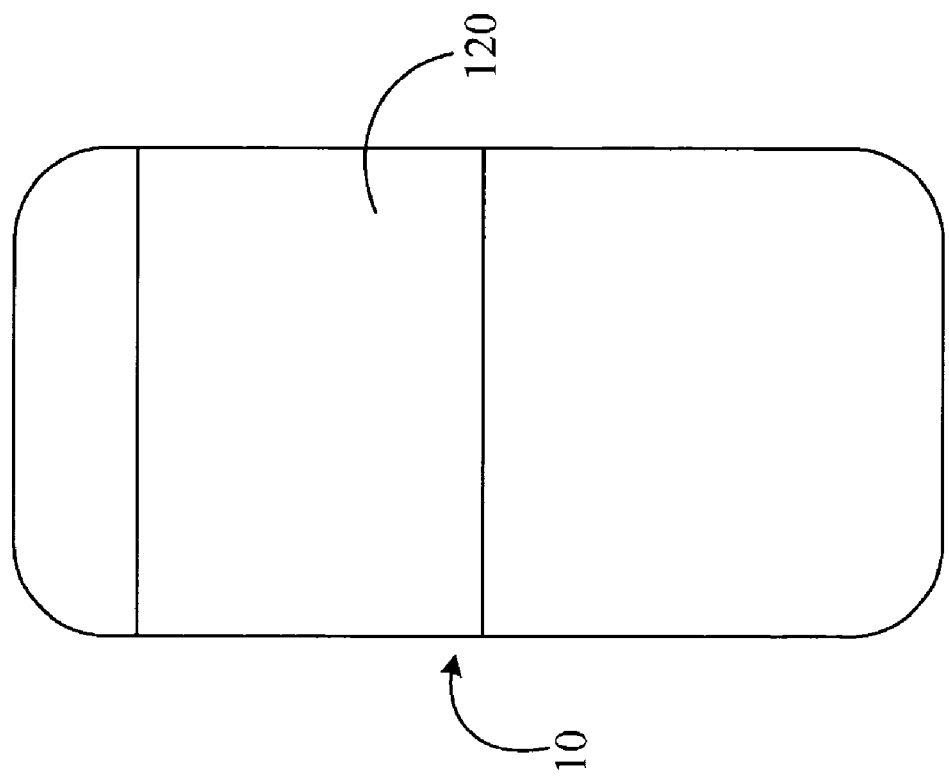
FIG. 2 is a schematic diagram showing the mobile phone of FIG. 1, viewed from the backside.
Figure 3:
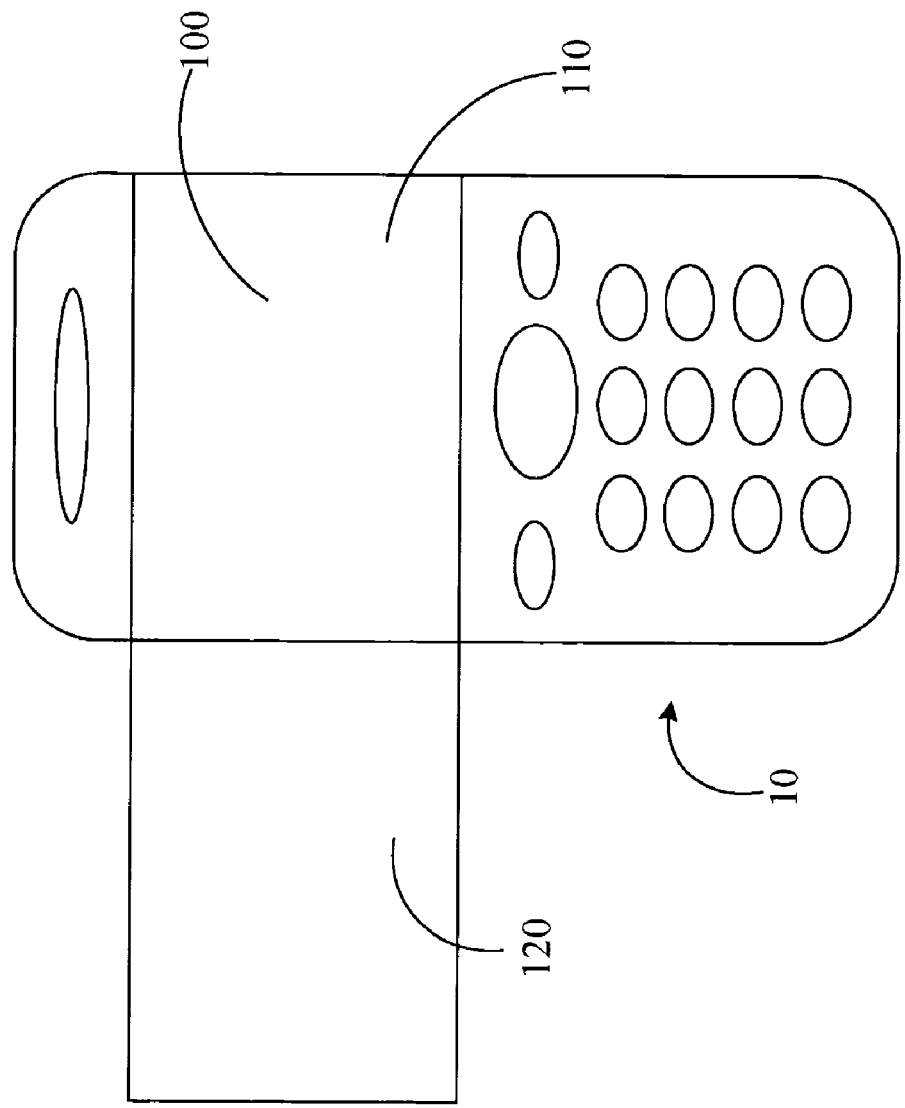
FIG. 3 is a schematic diagram showing the mobile phone of FIG. 1 in an expanded state.
Figure 4:
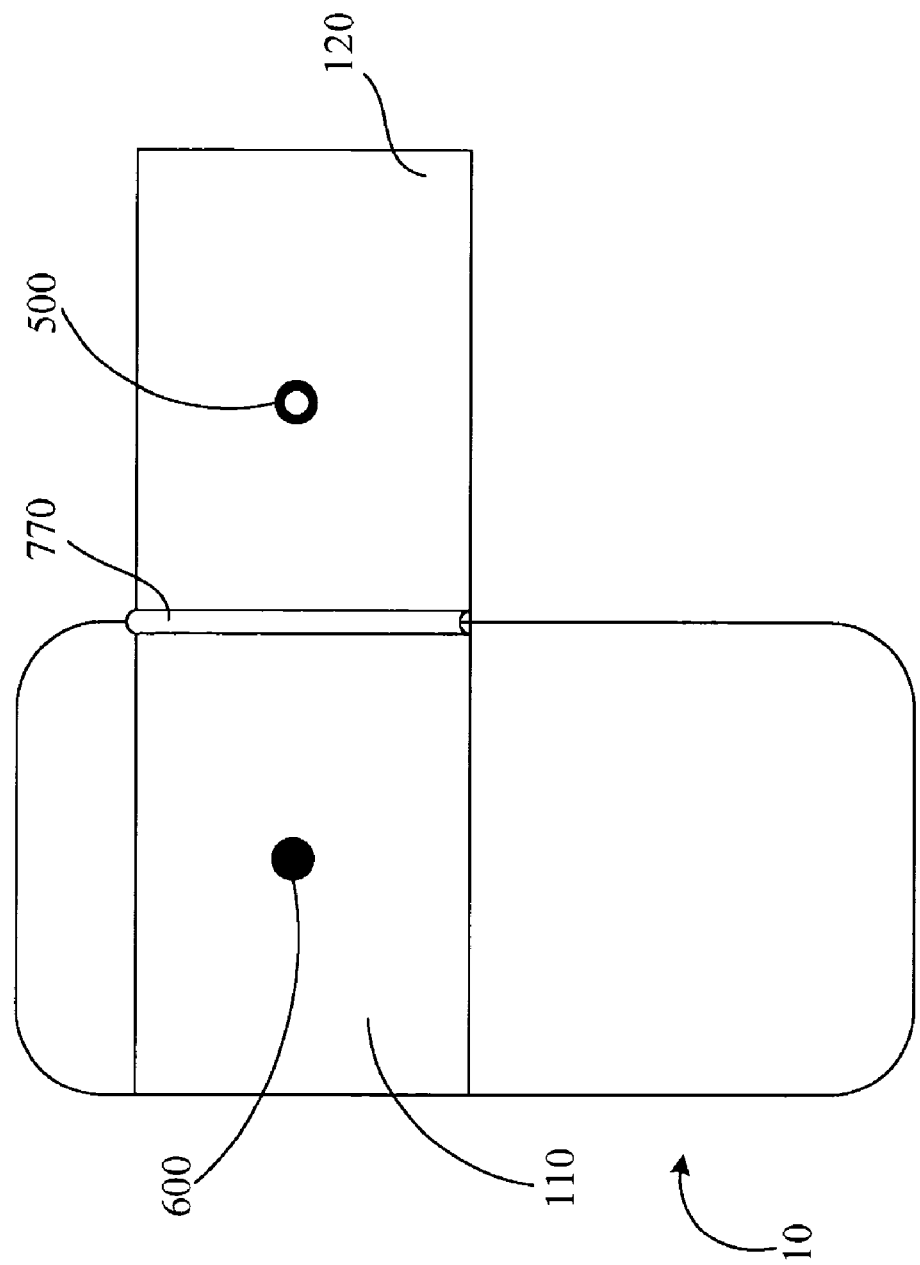
FIG. 4 is a schematic diagram showing the mobile phone of FIG. 1 in an expanded state, viewed from another aspect.

Referring to FIGS. 1 and 2, a mobile phone 10 in accordance with a preferred exemplary embodiment includes an expandable screen 100 and an input device 900. In the preferred embodiment, the input device 900 is a keypad. The expandable screen 100 includes a main screen 110 and an extension screen 120. Referring to FIG. 4, the extension screen 120 is pivotally connected to the main screen 110 via a hinge 770.

The expandable screen 100 has a first display mode that the main screen 110 is enabled while the extension screen 120 is disabled, a second display mode that the main screen 110 is disabled while the extension screen 120 is enabled, and a third display mode that the main screen 110 and the extension screen 120 are enabled.

Referring to FIGS. 1, 2, 3 and 4, the mobile phone 10 has at least two states e.g. a folded state and an expanded state. If the mobile phone 10 is in the folded state, the extension screen 120 is folded over a backside of the main screen 110. When the mobile phone 10 is in the folded state, the expandable screen 100 is in the first mode. If the mobile phone 10 is in the expanded state, the extension screen 120 is pivotally rotated with respect to the hinge 770, and unfolded from the main screen 110. Herein, the extension screen 120 and the main screen 110 connect with each other on a same plane to form an integrated screen. When the mobile phone 10 is in the expanded state, a display mode of the expandable screen 100 can be chosen.

The mobile phone 10 includes a detector 500 and a magnet 600. The detector 500 is formed on a backside of the extension screen 120 for detecting a magnetic intensity and the magnet 600 is formed on the backside of the main screen 110. The magnetic intensity is in inverse proportion to a distance between the magnet 600 and the detector 500. If the expandable screen 100 is in the folded state, the detector 500 is in close contact with the magnet 600 and the distance has a minimum value. In this case, the magnetic intensity has a maximum value. If the expandable screen 100 is in the expanded state, the distance has a maximum value. In this case, the magnetic intensity has a minimum value.

Figure 5:
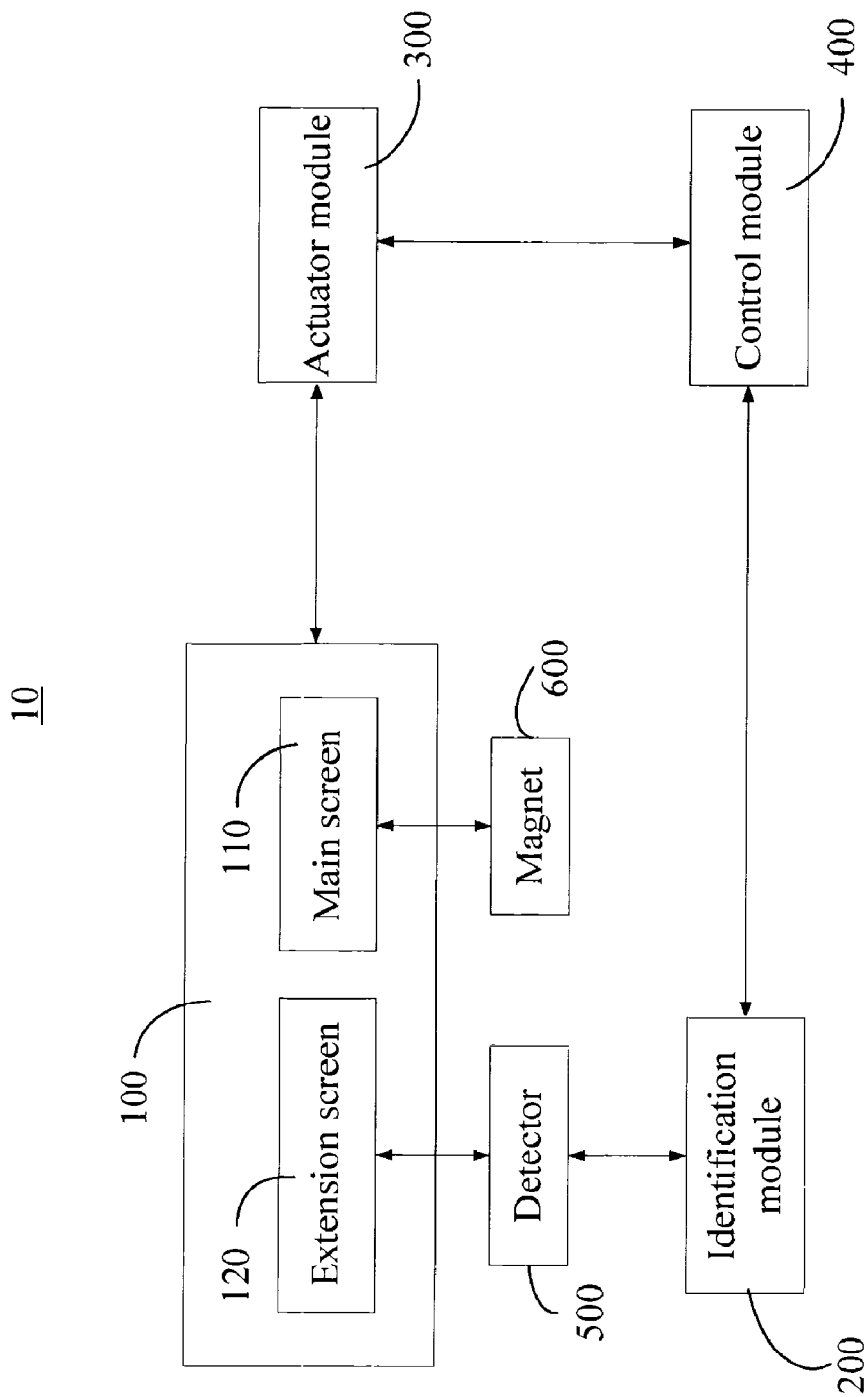
FIG. 5 is a schematic diagram showing a detailed structure of the mobile phone of FIG. 1.

Referring to FIG. 5, the mobile phone 10 also includes an identification module 200, an actuator module 300, and a control module 400. The identification module 200 is connected to the detector 500, and is for determining whether the detector 500 detects if the magnetic intensity has the minimum value. When the detector 500 detects that the magnetic intensity has the minimum value, the identification module 200 generates an identifying signal. The control module 400 is connected to the identification module 200 and the actuator module 300. The control module 400 is used for receiving the identifying signal and controlling the actuator module 300. The actuator module 300 is connected to the expandable screen 100, and is for enabling the expandable screen 100.

Figure 6:
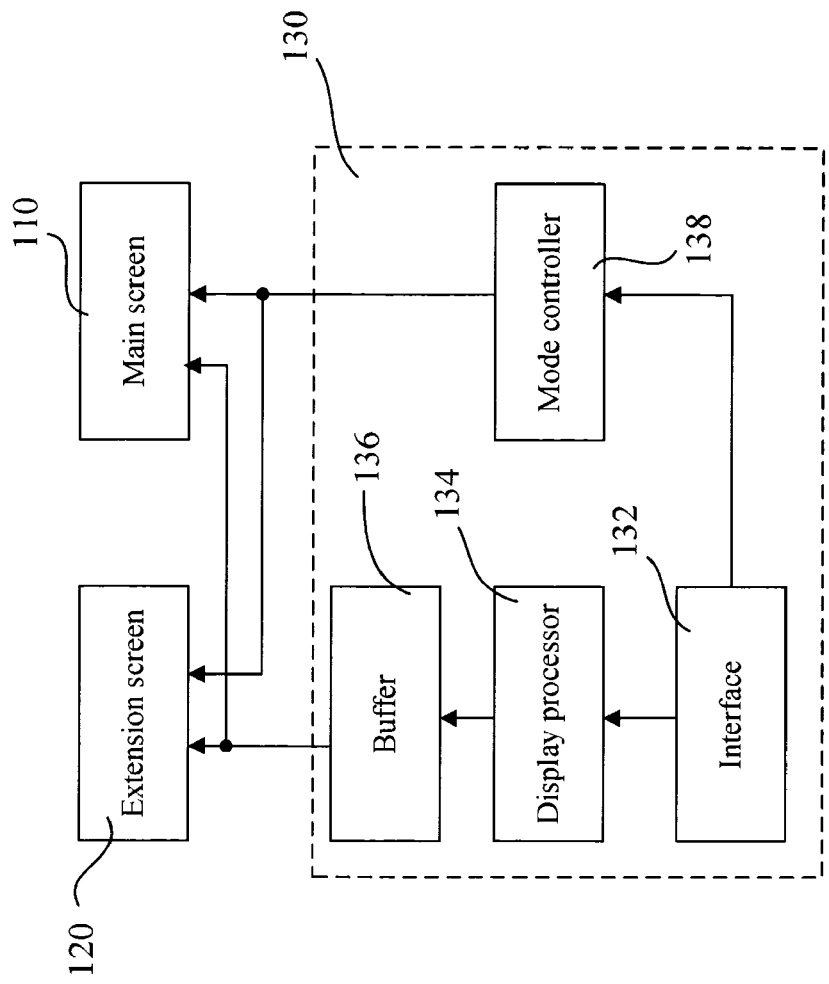
FIG. 6 is a schematic block diagram showing the expandable screen of the FIG. 1.

Referring to FIG. 6, after the expendable screen 100 is enabled, it receives display information and a display mode command from the input device 900. The expendable screen 100 includes the main screen 110, the extension screen 120, and a display controller 130. The display controller 130 is used for controlling the expendable screen 100 to display the display information according to the display mode command.

The display controller 130 includes an interface 132, a display processor 134, a buffer 136, and a mode controller 138. The interface 132 is for receiving the display information and the display mode command. The display processor 134 is for processing the display information to generate display data. The buffer 136 is for temporarily storing the display data. The mode controller 138 is for controlling the main screen 110 and the extension screen 120 to display the display data according to the display mode command.

As mentioned above, the extension screen 120 is used for connecting with the main screen 110 to expand a size of the expandable screen 100. Specifically, the extension screen 120 can be folded over while a size of the mobile phone 10 remains the same. Furthermore, since the magnet 600 is formed on the backside of the main screen and the detector 500 is used for detecting the magnetic intensity of the magnet 600, the distance between the magnet 600 and the detector 500 can be obtained and can be used to enable/disable the main screen 110 and the extension screen 120 correspondingly.

Figure 7:
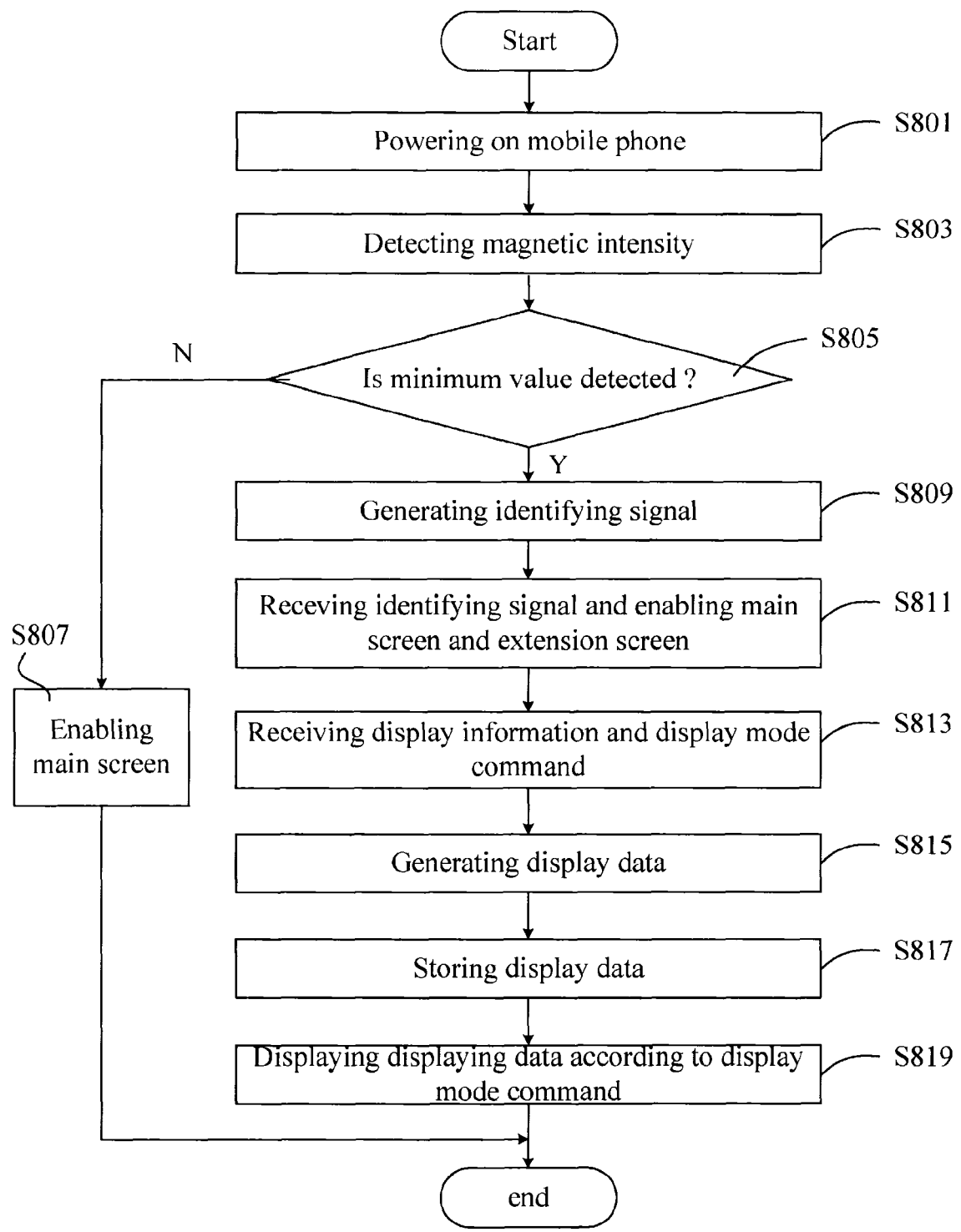
FIG. 7 is a flow chart illustrating an display controlling method in accordance with an exemplary embodiment.

Referring to FIG. 7, a display controlling method for above mentioned mobile phone 10 in accordance with an exemplary embodiment is for controlling the mobile phone 10 to display information with an integrated screen. A procedure of the display controlling method includes the following steps.

The mobile phone 10 is powered on (step S801).

The detector 500 detects the magnetic intensity (step S803).

The identification module 200 judges whether the minimum value of the magnetic intensity is detected by the detector 500 (Step S805). If the minimum value is not detected, the procedure goes to step S807. If the minimum value is detected, the procedure goes to step S809.

If the minimum value is not detected, the control module 400 controls the actuator module 300 to enable the main screen 110 (Step S807).

If the minimum value is detected, the identification module 200 generates the identifying signal (Step S809).

The control module 400 receives the identifying signal and controls the actuator module 300 to enable the expandable screen (Step S811).

The interface receives the display information and the display mode command (Step S813).

The display processor processes the display information to generate display data (Step S815).

The buffer temporarily stores the display data (Step S817).

The mode controller controls the main screen and the extension screen to display the display data according to the display mode command (Step S819).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mobile phone comprising:
   an expandable screen comprising a main screen and an extension screen, the expandable screen having a first display mode that the main screen is enabled while the extension screen is disabled, a second display mode that the main screen is disabled while the extension screen is enabled, and a third display mode that the main screen and the extension screen are enabled; and
   a magnet attached to the main screen;
   a detector attached to the extension screen for detecting magnetic intensity of the magnet;
   wherein the expandable screen is in the expanded state when a minimum value of the magnetic intensity is detected; and
   an input device adapted to generate a display mode command in response to a user's operation;
   wherein the mobile phone comprises a folded state that a backside of the main screen is overlaid with the extension screen, and the mobile phone comprises an expanded state that the extension screen is unfolded from the main screen; and
   wherein when the mobile phone is in the expanded state, the expandable screen is configured to be in one of the first display mode, the second display mode, and the third display mode based on the display mode command.

2. The mobile phone according to claim 1, further comprising an identification module for determining whether the detector detects the minimum value of the magnetic intensity and generating an identifying signal, a control module connected to the identification module for receiving the identifying signal, and an actuator module connected to the control module and the expandable screen; wherein the actuator is controlled by the control module to enable the expendable screen when the control module receives the identifying signal.

3. The mobile phone according to claim 1, wherein when the mobile phone is in the expanded state, the extension screen and the main screen connect with each other on a same plane to form an integrated screen.

4. The mobile phone according to claim 1, wherein when the expandable screen in the first mode, only the main screen displays the display data; when the expandable screen in the second mode, only the extension screen displays the display data; and when the expandable screen in the third mode, the extension screen and the main screen combine to display the display data.

5. The mobile phone according to claim 1, wherein the extension is pivotally connected to the main screen.

6. The mobile phone according to claim 1, wherein the magnet is formed on the backside of the main screen.

7. A display controlling method for a mobile phone, the mobile phone comprising an expandable screen with a main screen and an extension screen, a magnet mounted on the main screen, and a detector mounted on the extension screen; the expandable screen having a first display mode that the main screen is enabled while the extension screen is disabled, a second display mode that the main screen is disabled while the extension screen is enabled, and a third display mode that the main screen and the extension screen are enabled; the method comprising:
   powering on the mobile phone;
   detecting magnetic intensity;
   determining whether a minimum value of the magnetic intensity is detected;
   generating an identifying signal if the minimum value is detected;
   receiving the identifying signal;
   enabling an expandable screen based on the identifying signal;
   receiving display information and a display mode command input by a user;
   processing the display information;
   generating display data;
   storing the display data; and
   controlling a main screen and an extension screen of the expandable screen to be in one of the first display mode, the second display mode, and the third display mode to display the display data according to the display mode command.

8. The display controlling method according to claim 7, further comprising:

enabling the main screen if the minimum value is not detected.

9. The display controlling method according to claim 7, wherein when the mobile phone is in the expanded state, the extension screen and the main screen connect with each other on a same plane to form an integrated screen.

10. The display controlling method according to claim 7, wherein when the expandable screen in the first mode, only the main screen displays the display data; when the expandable screen in the second mode, only the extension screen displays the display data; and when the expandable screen in the third mode, the extension screen and the main screen combine to display the display data.

11. The display controlling method for a mobile phone, the mobile phone comprising an expandable screen with a main screen and an extension screen; a magnet attached to the main screen; and a detector attached to the extension screen for detecting magnetic intensity of the magnet; wherein the expandable screen is in the expanded state when a minimum value of the magnetic intensity is detected; the expandable screen having a first display mode that the main screen is enabled while the extension screen is disabled, a second display mode that the main screen is disabled while the extension screen is enabled, and a third display mode that the main screen and the extension screen are enabled; the mobile phone comprising a folded state that a backside of the main screen is overlaid with the extension screen, and an expanded state that the extension screen is unfolded from the main screen; the method comprising:

determining whether the mobile phone is in the expanded state or in the folded state;

enabling the main screen and the extension screen if the mobile phone is in the expanded state;

receiving display data and a display mode command input by a user; and controlling the expandable screen to be in one of the first display mode, the second display mode, and the third display mode to display the display data based on the display mode command.

12. The display controlling method according to claim 11, wherein when the mobile phone is in the expanded state, the extension screen and the main screen connect with each other on a same plane to form an integrated screen.

13. The display controlling method according to claim 11, wherein when the expandable screen in the first mode, only the main screen displays the display data; when the expandable screen in the second mode, only the extension screen displays the display data; and when the expandable screen in the third mode, the extension screen and the main screen combine to display the display data.

14. The display controlling method according to claim 11, further comprising:

enabling the main screen if the mobile phone is in the folded state; and receiving display data and controlling the main screen to display the display data.

* * * * *